US012529254B2

(12) United States Patent
Eini

(10) Patent No.: US 12,529,254 B2
(45) Date of Patent: Jan. 20, 2026

(54) WOOD CLAD RAIL SYSTEM FOR GLASS DOORS AND SIDELITES

(71) Applicant: Yuval Al Eini, Sun Valley, CA (US)

(72) Inventor: Yuval Al Eini, Sun Valley, CA (US)

( * ) Notice: Subject to any disclaimer, the term of this patent is extended or adjusted under 35 U.S.C. 154(b) by 218 days.

(21) Appl. No.: 18/510,604

(22) Filed: Nov. 15, 2023

(65) Prior Publication Data

US 2025/0154813 A1 May 15, 2025

(51) Int. Cl.
*E05D 15/00* (2006.01)
*E05D 15/06* (2006.01)

(52) U.S. Cl.
CPC ..... *E05D 15/0652* (2013.01); *E05D 15/0686* (2013.01); *E05Y 2201/11* (2013.01); *E05Y 2201/684* (2013.01)

(58) Field of Classification Search
CPC . E05D 15/00; E05D 15/0652; E05D 15/0656; E05D 15/0686; E95Y 2201/11; E05Y 2201/684
See application file for complete search history.

(56) References Cited

U.S. PATENT DOCUMENTS 3,955,799 A * 5/1976 Lauzier ............... E04F 11/1817 256/65.11
3,982,735 A * 9/1976 Fornells .............. E04F 11/1836 256/59
4,914,888 A * 4/1990 Hanson ................. E06B 3/5454 52/800.14
5,069,010 A 12/1991 Trainor, Jr. et al.
6,434,905 B1 8/2002 Sprague
6,912,818 B2 7/2005 Sprague
7,036,799 B2 5/2006 Shepherd
7,384,025 B2 * 6/2008 Lo ....................... E04H 17/1439 256/65.13
7,584,588 B2 * 9/2009 Kim ...................... E06B 3/5864 52/204.597
7,963,077 B2 6/2011 Lin
8,500,110 B2 8/2013 Allen
9,074,413 B1 7/2015 Sprague
9,303,444 B1 4/2016 Choi
9,777,484 B2 10/2017 Header
10,202,777 B1 * 2/2019 Leavey ............... E04F 19/0481
10,583,957 B2 * 3/2020 Akhavan-Tabassi ........................ B65D 11/1873
10,829,971 B2 11/2020 Murray et al.
10,871,026 B1 12/2020 Mourchid
11,053,728 B2 7/2021 Zucker et al.
11,187,323 B2 11/2021 Sprague
(Continued)

OTHER PUBLICATIONS

Panda Windows and Doors, Profile, Available at: https://www.panda-windows.com/residential/aluminum-wood-%20clad-impact-is-14/ (last visited: Sep. 22, 2023).

*Primary Examiner* — Chi Q Nguyen
(74) *Attorney, Agent, or Firm* — Trojan Law Offices, P.C.

(57) ABSTRACT

A wood clad rail system for glass doors and sidelites for holding panels, such as a glass pane in a door, sidelite, or wall partition. The rail system for the glass door, may include a pair of metal clamping rails, covered by wood clad attachments such as side covers or end caps, to hold the glass pane from the top and bottom of the glass pane. A snap-in header can be coupled to the clamping rail from the top through a pivot. The wood clad rail system can be incorporated into a complete wall partition that includes doors and sidelites.

15 Claims, 6 Drawing Sheets

(56) References Cited

U.S. PATENT DOCUMENTS

| | | | | |
|---|---|---|---|---|
| 11,613,923 | B2 * | 3/2023 | Mourchid ............... | E06B 3/305<br>52/208 |
| 11,891,852 | B1 * | 2/2024 | McSpadden .......... | E06B 3/5864 |
| 12,044,062 | B2 * | 7/2024 | Mourchid ............. | E06B 3/5864 |
| 2010/0018145 | A1 * | 1/2010 | Ellis .................... | E04F 19/0436<br>52/312 |
| 2014/0290166 | A1 * | 10/2014 | Bordener ............ | E04F 13/0816<br>52/474 |

* cited by examiner

WOOD CLAD RAIL SYSTEM FOR GLASS DOORS AND SIDELITES

FIELD OF THE INVENTION

The present invention relates to covering and fixing of glass panes and in particular relates to a wood clad rail system for glass doors and sidelites.

BACKGROUND

Rail systems have been widely used in glass doors and sidelites for holding glass panes/panels. Rail systems are conventionally attached to the bottom, top, or sides of such glass panes to form door panels, sidelites, or wall partitions.

Usually, the rail systems, commonly made of metal, run along one or more edges/sides of a glass pane to secure the pane to a pivot point via one or more adjustable clamps. Such metal rail systems may further include metal covers such as aluminum covers that can be attached to the external walls of the rail through attachment mechanisms such as a tongue and groove mechanism.

It is an object of the present invention to provide a unique, novel, easy to install, and aesthetically pleasing wood clad rail system for glass doors and sidelites, including wood clad rails for the bottom and top of the glass door, a snap-in header for the top of the glass door, and rails for holding the sidelites. This and other objects are more fully described in the following specification and drawings.

SUMMARY

The present invention provides a novel wood clad rail system for glass doors and sidelites for holding panels, such as a glass pane. The rail system for the glass door, may include a pair of metal clamping rails that hold the glass pane from the top and bottom of the glass pane. The door rail system can be covered by wood clad attachments such as side covers or end caps. The invention further provides a snap-in header that can be coupled to the clamping rail from the top of the glass door. The wood clad attachments may be constructed as a retrofit part to be used with existing rail systems. The invention further provides top and bottom rails for sidelites, made of solid wood, designed and manufactured to hold glass panels. The wood clad rail system can be incorporated into a complete wall partition that includes doors and sidelites. Disclosed wood clad covers, snap-in header, and sidelite rails can improve the accessibility of the associated glass doors or sidelites while preserving the aesthetic appearance of the wall partition.

The wood clad rail system may provide a cover for a rail system, wherein the rail system may have a first extended sidewall and a second extended side wall. The first extended sidewall may have a first inwardly inclined sidewall and an extended flat surface. The rail system can be operatively coupled to a glass pane. The cover may comprise an elongated body made from wood. The elongated body may have an internal surface, an external surface, a first end surface, a second end surface, and a height. The internal surface may conform to the first extended sidewall of the rail system. The internal surface may comprise a first recess, and the first recess may be adapted to adjoin the extended flat surface of the first extended sidewall through an attachment mechanism. The attachment mechanism can be an adhesive attachment mechanism. The first recess may have a height, wherein the height of the recess can be bigger than ⅓ of the height of the elongated body. The extended flat surface can be adapted to be parallel to the glass pane. The internal surface of the elongated body may further comprise a first inclined surface, wherein the first inclined surface can be inclined toward the first inwardly inclined sidewall of the rail system. In an implementation of the invention, the first inclined surface of the elongated body is not in direct contact with the inwardly inclined sidewall of the rail system.

The invention also provides a wood clad rail system for a glass door and a sidelite, wherein the glass door may have a top clamping rail and a bottom clamping rail, the top clamping rail may have a pair of mutually opposite inclined sidewalls and a pair of mutually opposite vertical sidewalls, the top clamping rail and the bottom clamping rail can hold a first glass pane, the sidelite may have a second glass pane. The system may further comprise a pair of extended side covers for covering the top clamping rail, wherein the extended side covers are made from wood, the extended side covers have a pair of extended inclined surfaces and a pair of extended vertical surfaces. The pair of extended vertical surfaces are adapted to adjoin the pair of mutually opposite vertical sidewalls by an attachment mechanism. The pair of extended inclined surfaces are adapted to conform to the pair of mutually opposite inclined sidewalls.

The system may further comprises a snap-in header for providing a support for the glass door, wherein the snap-in header is made from wood, the snap-in header comprises an extended header base and an extended removable track. The extended header base comprises a bottom surface, the bottom surface having a recess. The extended removable track is adapted to snap into the recess of the extended header base. The top clamping rail is rotatably coupled to the snap-in header, thereby allowing the glass door to rotate relative to the snap-in header. The recess may have a pair of channels. The extended removable track may comprise a pair of extended projections. When the extended removable track is being snapped into the recess of the extended header base, the pair of extended projections can be inserted into the pair of channels. The pair of channels can be a pair of mutually opposite parallel channels and the pair of extended projections can be a pair of mutually opposite extended parallel projections. The attachment mechanism is an adhesive attachment mechanism.

The system may further comprise a top rail system for holding a top of the second glass pane of the sidelite. The top rail system can be made from solid wood. The top rail system may comprise a top base track and a top glass holder track. The top glass holder track may have a lower channel and a top surface. The top base track may have a bottom surface. The lower channel can be adapted to receive the top of the second glass pane. The top surface of the top glass holder track can be adapted to be coupled to the bottom surface of the top base track, wherein the top rail system can be adapted to be longitudinally aligned with the top clamping rail.

The system may further comprise a bottom rail system for a bottom of the second glass pane of the sidelite. The bottom rail system can be made from solid wood. The bottom rail system may comprise a bottom base track and a bottom glass holder track. The bottom glass holder track may have a top channel, and the top channel can be adapted to receive the bottom of the second glass pane. The bottom glass holder track can be adapted to be placed on the bottom base track, wherein the bottom rail system can be adapted to be longitudinally aligned with the bottom clamping rail.

Another implementation of the present invention provides a wood clad rail system for a glass door and a sidelite, wherein the glass door may have a top clamping rail and a bottom clamping rail, the top clamping rail may have a pair of mutually opposite inclined sidewalls and a pair of mutually opposite vertical sidewalls, the top clamping rail and the bottom clamping rail can be adapted to hold a first glass pane, and the sidelite may have a second glass pane. An improvement to the system may comprise a pair of extended side covers for covering the top clamping rail. The extended side covers can be made from wood. The extended side covers may have a pair of extended inclined surfaces and a pair of extended vertical surfaces. The pair of extended vertical surfaces can be adapted to adjoin the pair of mutually opposite vertical sidewalls by an attachment mechanism. The pair of extended inclined surfaces are adapted to conform to the pair of mutually opposite inclined sidewalls.

The improvement to the system may further comprise a top rail system for holding a top of the second glass pane of the sidelite. The top rail system can be made from solid wood. The top rail system may comprise a top base track and a top glass holder track. The top glass holder track may have a lower channel and a top surface and the top base track may have a bottom surface. The lower channel can be adapted to receive a top of the second glass pane. The top surface of the glass holder track can be adapted to be coupled to the bottom surface of the top base track, wherein the top glass holder track can be adapted to be longitudinally aligned with the top clamping rail and the pair of extended side covers.

The improvement to the system may further comprise a bottom rail system for holding a bottom of the second glass pane of the sidelite. The bottom rail system can be made from wood. The bottom rail system may comprise a bottom base track and a bottom glass holder track. The bottom glass holder track may have a top channel, the top channel can be adapted to receive the bottom of the second glass pane, and the bottom glass holder track can be adapted to be place on the bottom base track, wherein the bottom rail system can be adapted to be longitudinally aligned with the bottom clamping rail. The recess may have a pair of channels. The extended removable track may comprise a pair of extended projections. When the extended removable track is being snapped into the recess of the extended header base, the pair of extended projections can be inserted into the pair of channels. The pair of channels can be a pair of mutually opposite parallel channels and the pair of extended projections can be a pair of mutually opposite extended parallel projections. The attachment mechanism can be an adhesive attachment mechanism.

DETAILED DESCRIPTION OF THE FIGURES

The present invention is described more fully hereinafter, but not all embodiments are shown. While the invention has been described with reference to exemplary embodiments, it will be understood by those skilled in the art that various changes may be made, and equivalents may be substituted for elements thereof without departing from the scope of the disclosure. In addition, many modifications may be made to adapt a particular structure or material to the teachings of the disclosure without departing from the essential scope thereof.

The drawings accompanying the application are for illustrative purposes only. They are not intended to limit the embodiments of the present application. Additionally, the drawings are not drawn to scale. Common elements between different figures may retain the same numerical designation.

Figure 1:
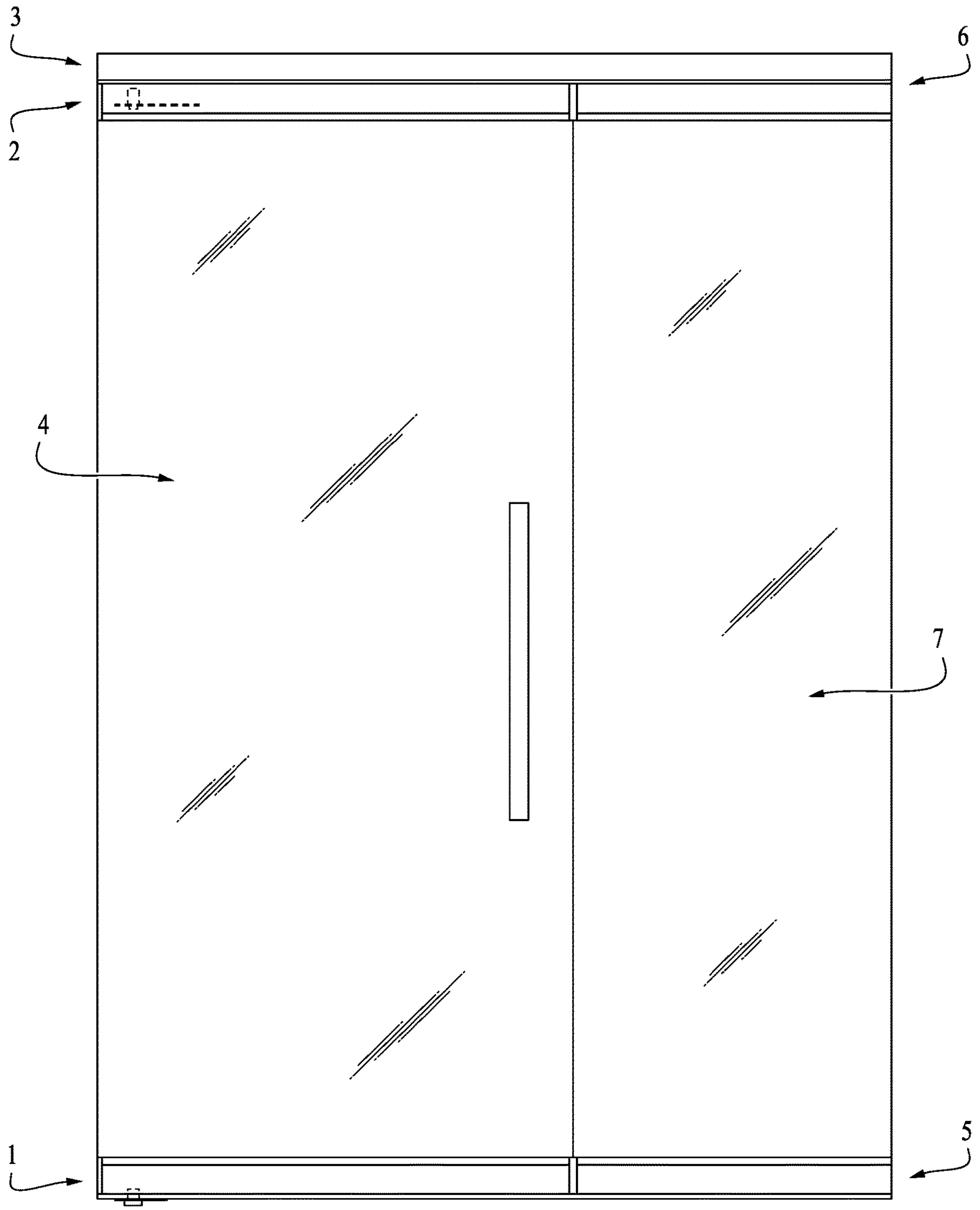
FIG. 1 illustrates a general front view of a glass door and a sidelite.

FIG. 1 illustrates a general front view of a glass door and a sidelite that are attached to a rail system positioned at the top and bottom of the glass door and the sidelite. The glass door may comprise a glass pane 4 that is held in place between a door bottom rail system 1 and a door top rail system 2, wherein the door top rail system can be rotatably coupled to a door top snap-in header 3. The sidelite may comprise a glass pane 7 that is held in place between a sidelite bottom rail system 5 and a sidelite top rail system 6.

Door Bottom Rail System

Figure 8:
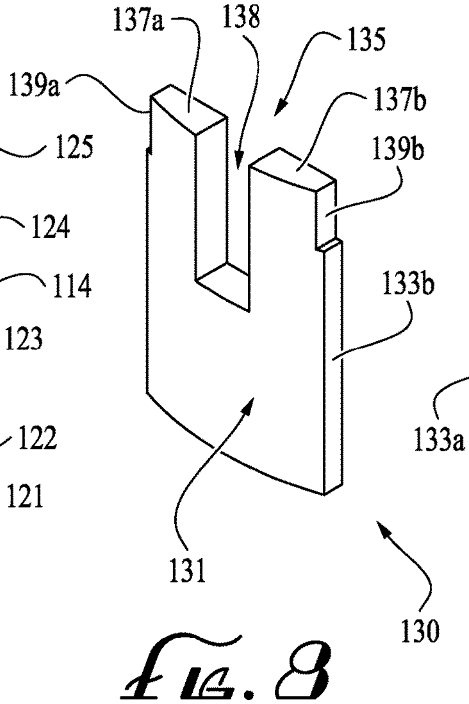
FIG. 8 illustrates a perspective view of the end cap of the door bottom door rail system.
Figure 9:
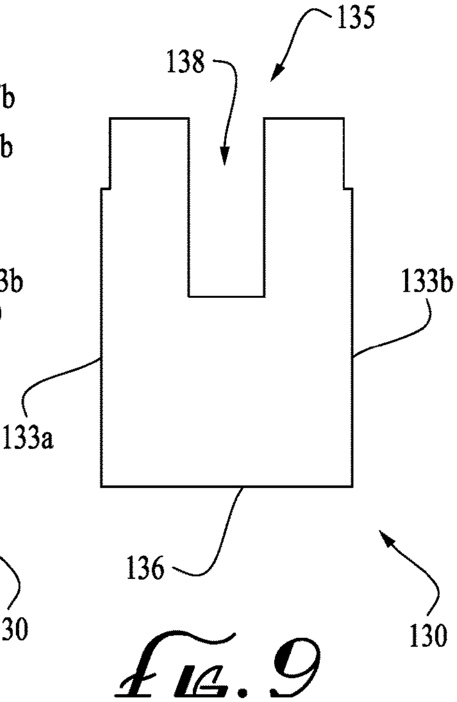
FIG. 9 illustrates a front view of the end cap of the door bottom rail system.
Figure 10:
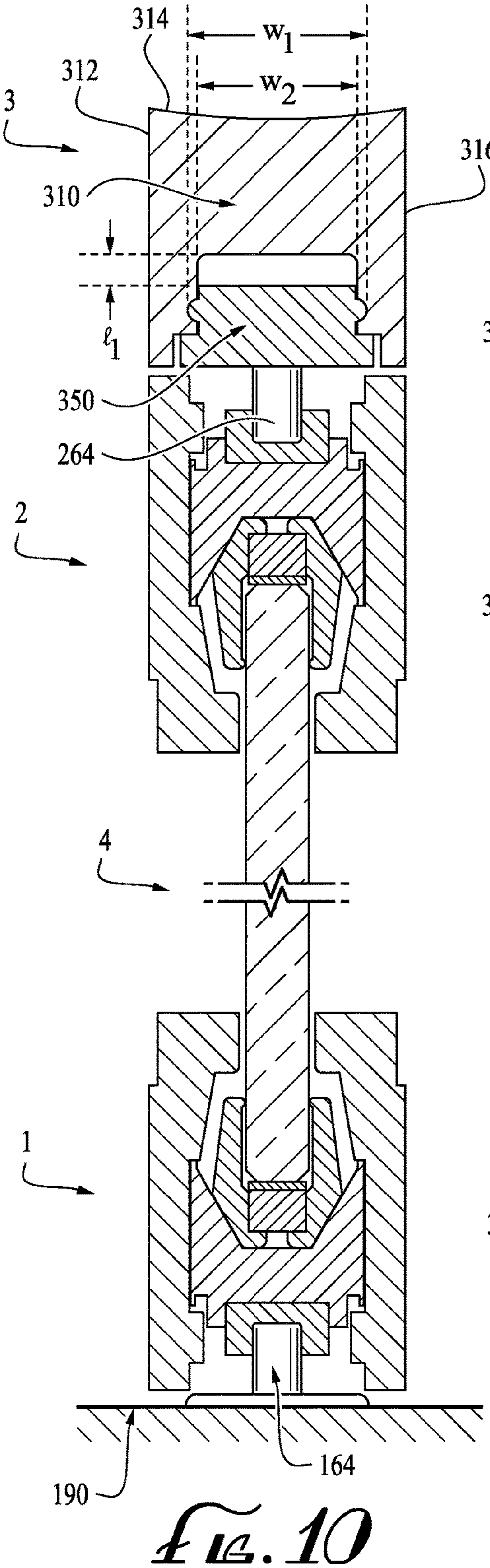
FIG. 10 illustrates a cross section of the glass door, while a glass pane of the glass door is being held in place between the door bottom rail system and a door top rail system, while the door is coupled to a door top snap-in header.

FIGS. 2-10 illustrate details of an embodiment of the door bottom rail system 1 and the door top rail system 2 (as further shown in FIG. 1 with respect to other parts of the system). The door top rail system 2 may have a similar structure as the door bottom rail system 1. Accordingly, all the following descriptions with regard to the door bottom rail system 1 can be applied to the door top rail system 2, except that the door top rail system 2 is attached to a top surface through a pivot 264 in an opposite direction, while the bottom rail system 1 is attached to a bottom surface 190 through a pivot 164 (as shown in FIG. 10).

Figure 2:
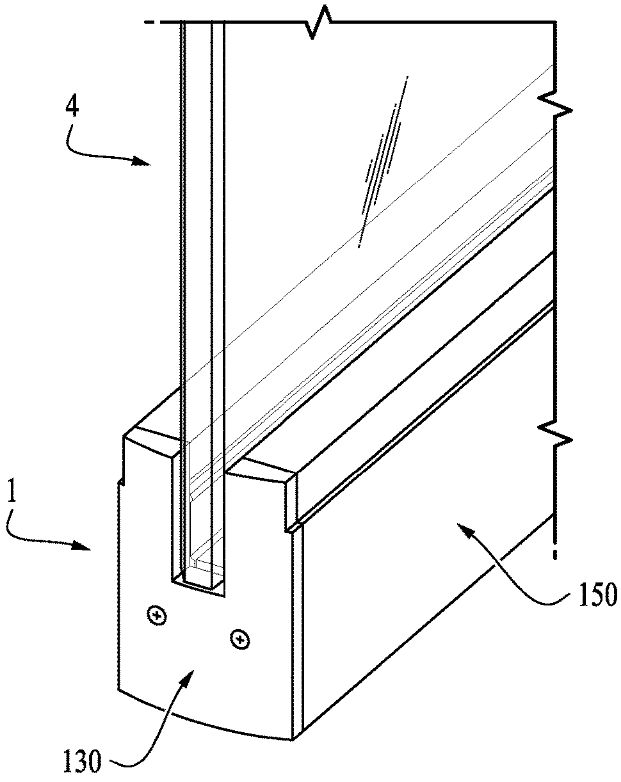
FIG. 2 illustrates a perspective view of a door bottom rail system and a glass pane attached thereto.
Figure 3:
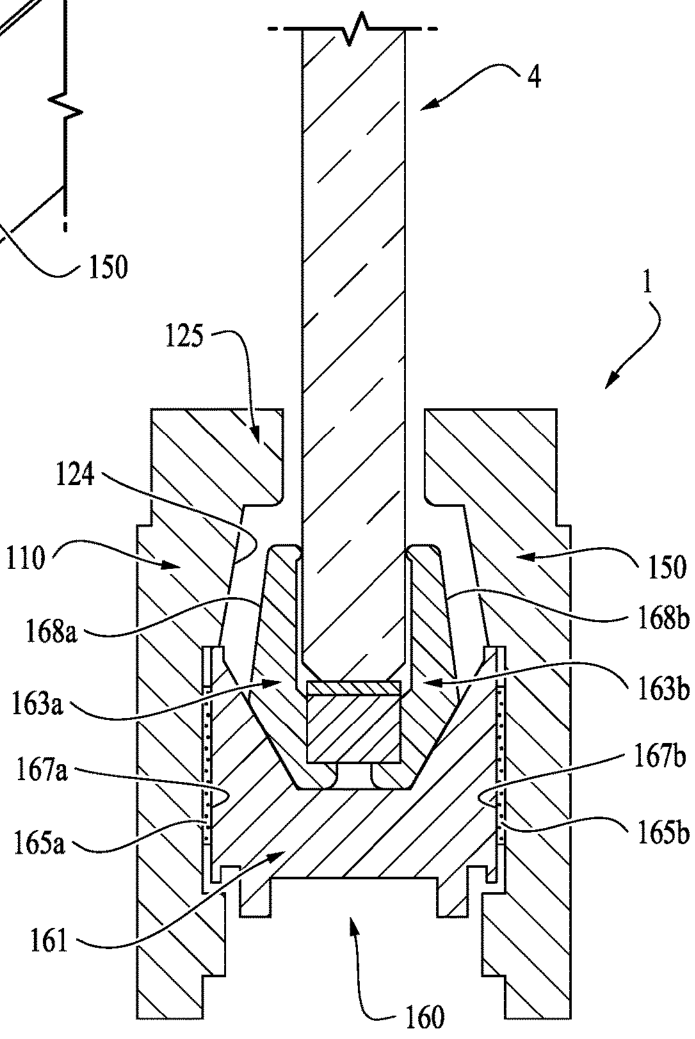
FIG. 3 illustrates a cross section of the door bottom rail system including a clamping rail and a pair of side covers.

Referring to FIGS. 2-3, the figures illustrate the door bottom rail system 1 that is attached to a glass pane 4 of a glass door. In this embodiment, the glass pane 4 can be attached to the door bottom rail system 1 through a core rail 160, wherein the core rail 160 is covered by side covers (110, 150). The side covers (110, 150) are preferably made from wood, wherein the wood side covers can be coupled to the core rail 160, thereby, providing a wood clad door rail for the glass door.

Figure 5:
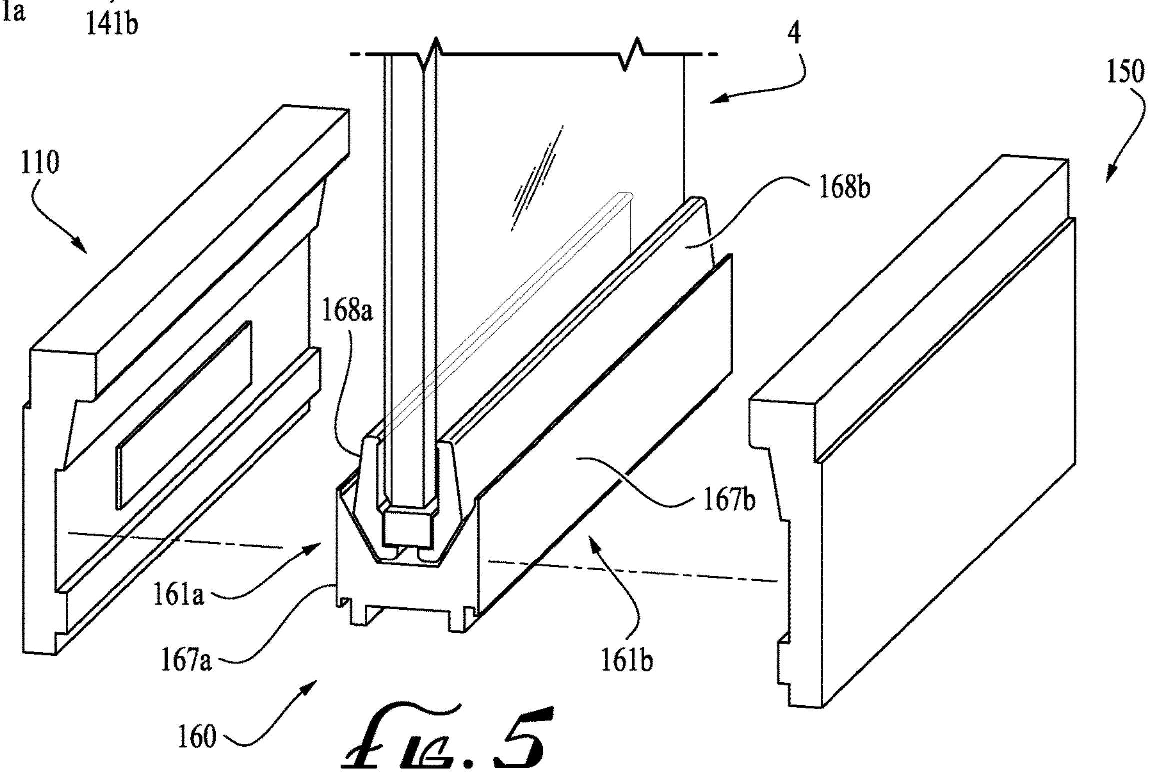
FIG. 5 illustrates a perspective view of the door bottom rail system with the pair of side covers are detached from the clamping rail.

According to FIGS. 3 and 5, the core rail 160 may comprise a support track 161 and a pair of extended clamps (163*a* and 163*b*) that can hold the glass pane 4. The extended clamps (163*a*, 163*b*) may have two mutually opposite inclined walls (168*a*, 168*b*). The support track 161 may have a pair of extended external walls (a first extended external wall 167*a* and a second extended external wall 167*b*). The extended walls 167*a* and 167*b* can be two mutually opposite vertical, parallel walls. The core rail 160 is preferably made of a metallic material such as aluminum which provides support for holding the glass pane 4 through its extended clamps (163*a*, 163*b*).

Figure 6:
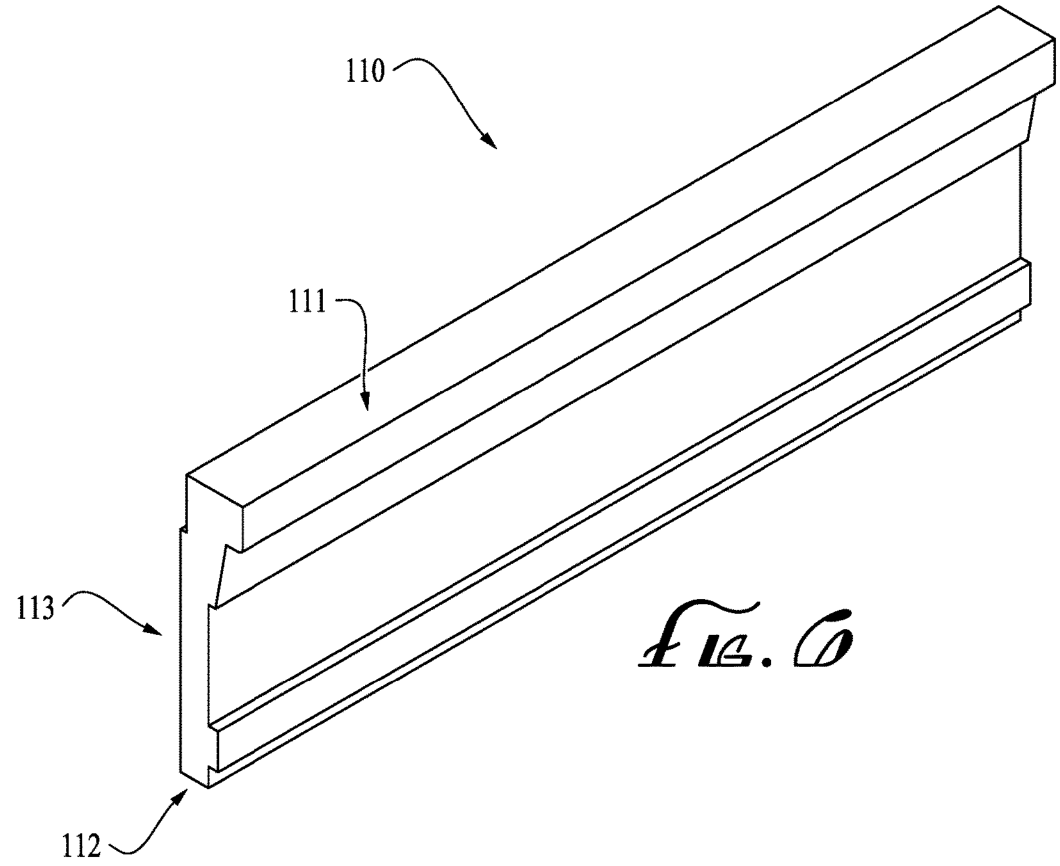
FIG. 6 illustrates a perspective view of one of the pair of side covers of the door bottom rail system.
Figure 7:
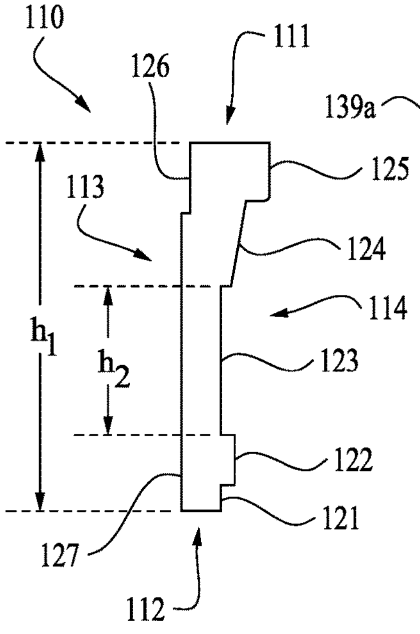
FIG. 7 illustrates a cross section of one of the pair of side covers of the door bottom door rail system.

FIGS. 3 and 5-7 illustrate various views of the side covers 110 and 150. As shown in FIGS. 6-7, the side cover 110 can comprise an elongated body having an extended internal surface 114, an extended external surface 113, a first extended end surface 111, and a second extended end surface 112. The extended internal surface 114 may comprise a first projection 125, a first inclined surface 124, a first recess 123, a second projection 122, and a second recess 121. The first projection 125 is positioned between the first extended end surface 111 and the first inclined surface 124. The inclined surface 124 is positioned between the first projection 125 and the first recess 123. The first recess 123 is positioned between the first inclined wall 124 and the second projection 122. The second projection is positioned between the first recess 123 and the second recess 121. The recess 121 is positioned between the second projection 122 and the second extended end surface 112. The extended external surface 113 may comprise an external recess 126 and an external projection 127, wherein the external recess 126 is positioned between the first extended end surface 111 and the external projection 127, and wherein the external projection 127 is positioned between the recess 126 and the second extended end surface 112. The extended external wall 113 may have a height (h1), and the recess 123 may have a height (h2), wherein h2 is smaller than h1. In an implementation of the present invention, the height (h2) of the recess 123 may be adapted to be bigger than ⅓ of the height (h1) of the extended external wall 113. In another implementation of the present invention, the height (h2) of the recess 123 may be adapted to be bigger than ¼ of the height (h1) of the extended external wall 113. In another implementation of the present invention, the height (h2) of the recess 123 may be adapted to be bigger than ⅕ of the height (h1) of the extended external wall 113.

Figure 4:
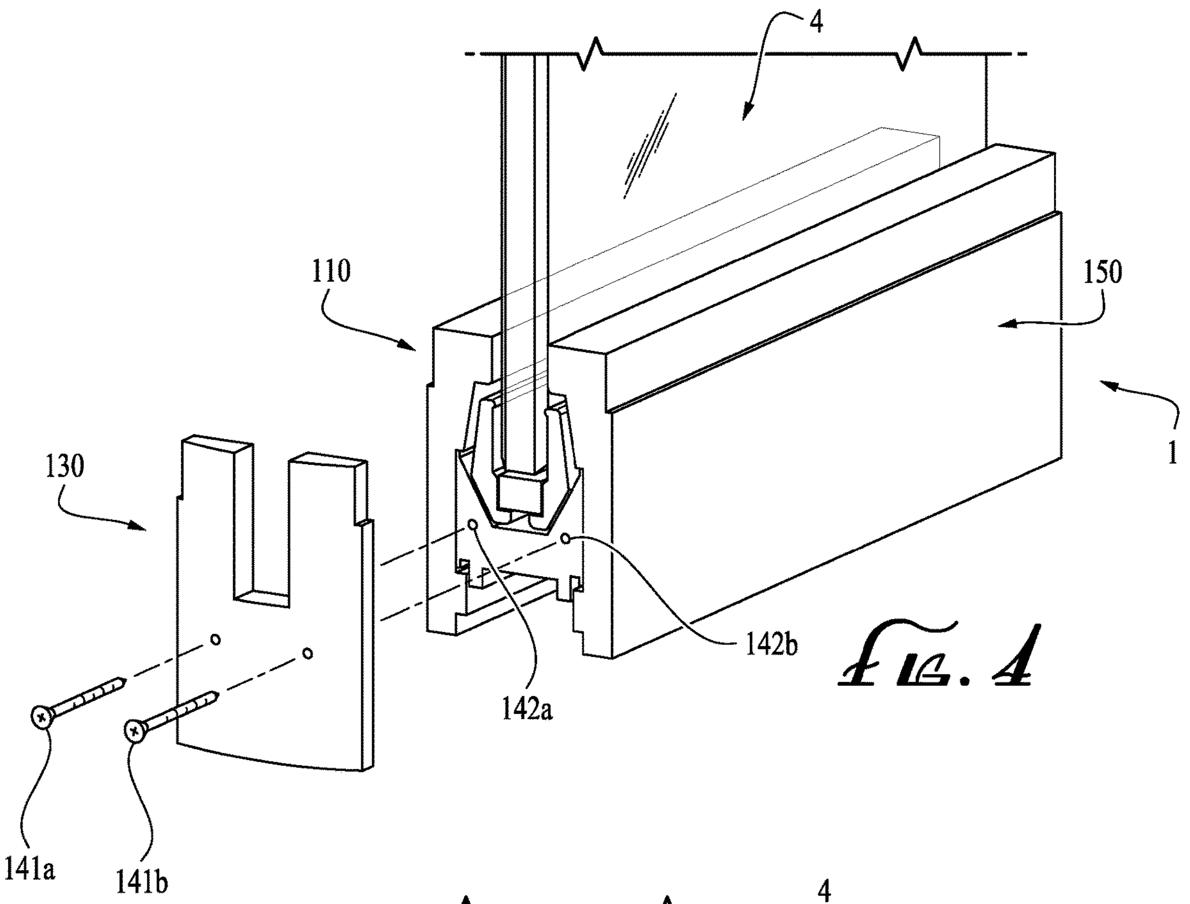
FIG. 4 illustrates a perspective view of the door bottom rail system while an end cap is being attached.

According to an embodiment of the invention as shown in FIGS. 3-5, the side covers 110 and 150 can be of the same shape and size, and can be adjoined symmetrically to a pair of the extended walls (161*a*, 161*b*) of the core rail 160 as shown. In an implementation of this embodiment, the side covers 110 and 150 can be adjoined to the core rail 160 through double sided adhesive tapes 165*a* and 165*b* (shown in FIG. 3), and/or other attachment mechanisms such as a force fit, friction fit, snap fit, adhesive material, or a tongue/groove mechanism. In an implementation of this embodiment, the internal surface of the side covers may conform to the extended walls (161*a*, 161*b*) of the core rail 160 (as shown in FIGS. 3 and 5).

Referring to FIGS. 3, 5, and 7, the extended internal surface 114 (as shown in FIG. 7) of the side cover 110 may conform to the first extended external wall 161*a* of the rail system 160 (shown in FIG. 3). Similarly, an internal surface of the side cover 150 may conform to the second extended external wall of the rail system as shown in FIG. 3. Therefore, side covers (110, 150) may cover the external extended walls of the core rail 160. In an implementation of the present invention, the side cover 110 may be attached to the core rail 160 through the recess 123. As a non-limiting example, the recess 123 may adjoin the extended wall 167*a* of the core rail 160 by an adhesive material. Similarly, the side cover 150 may be adjoined to the extended wall 167*b* of the core rail 160 by a similar attachment mechanism (shown in FIG. 3). When the side cover 110 is adjoined to the core rail 160, the first projection 125 extends over the clamp 163*a* toward the glass pane 4 (shown in FIG. 3) to cover and protect the clamp 163*a* and to provide a better aesthetic appearance for the bottom door rail system 1. The first projection 125 may have a surface that can be positioned parallel to the glass pane while the side cover 110 is in its adjoined position. In its adjoined position, the side cover 110 (or side cover 150) may also provide a shield that makes the glass pane and the core rail 160 stronger and more resistant to impact. In an implementation of this embodiment, the side cover 150 can be adjoined to the second extended external wall of the core rail 110 with a similar mechanism as provided for the side cover 110 discussed above.

According to an implementation of the present invention, when the side cover 110 is adjoined to the core rail 160 (as shown in FIG. 3), preferably, the first inclined surface 124 of the side cover 110 is not in direct contact with the first inclined wall 168*a* of the core rail 160. Such a feature would provide enough space for the movement of the adjustable extended clamps (163*a* and 163*b* as shown in FIG. 3) of the core rail 160 while the glass pane 4 is being coupled to the core rail 160. The side cover 150 can also be adjoined to the core rail 160 with a similar configuration.

Referring to FIG. 4, the end of the core rail 160 can be further covered by an end cap 130 that can be coupled to the side covers (110, 150) and/or the core rail 160 through screws 141*a* and 141*b* (as shown in FIG. 4) and holes 142*a* and 142*b*, wherein the holes can be grooved, and/or through other attachment mechanisms such as a force fit, snap fit, friction fit, or adhesive mechanism. The end cap 130 is preferably made from wood. The end cap 130 can be positioned at the opposite ends of the door bottom rail system 1. According to a preferred embodiment of this invention, the end cap 30 conforms to the end of the door bottom rail system 1 as shown in FIGS. 2 and 4. Similar end caps may also be used for covering opposite ends of the door top rail system 2.

Referring to FIGS. 8-9, the end cap 130 may have an external surface 131, an internal surface opposite to the external surface 131, a first end surface 135, a second end surface 136, side projections (133*a*, 133*b*), and side recesses (139*a*, 139*b*). The first end surface 135 may comprise surfaces (137*a*, 137*b*) and a recess 138 positioned between the surfaces (137*a*, 137*b*). The recess 138 may provide a rectangular window that allows the glass pane 4 (shown in FIG. 4) to slide through for further adjustment or installation. The external surface 131 can be a curved surface to provide a better protection against impacts, and to provide enough space for the movement of the movable parts of the glass door. The end cap further provides an aesthetically attractive, removable cover at the end of the door bottom rail system.

Door Top Rail System

FIG. 10 illustrates a door top rail system 2, wherein the glass pane 4 is being held in place between the door top rail system 2 from the top and the door bottom rail system 1 from the bottom. According to FIG. 10, the door top rail system 2 has a similar function and structure as the door bottom rail system 1 and can be made and assembled similarly, except that the door top rail system 2 is attached to a top surface through a pivot 264 in an opposite direction as shown in FIG. 10, while the bottom rail system 1 is attached to a bottom surface 190 through a pivot 164. The door top rail system 2 may have similar parts and sections (with a similar shape and size) as described with respect to the door bottom rail system 1, including a core rail, side covers, and end caps. The door bottom rail system 1 and the door top rail system 2 hold the glass pane 4 from the bottom and top respectively, and allow the rotation of the glass door through the pivots 164 and 264.

Door Top Snap-in Header

Figure 11:
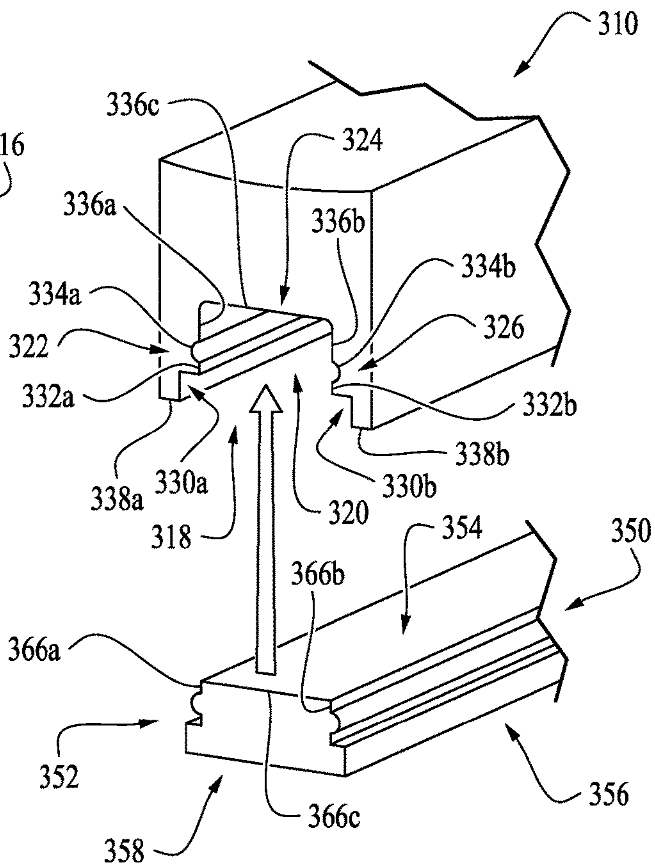
FIG. 11 illustrates a perspective view of the door top snap-in header while its parts are detached.

According to FIGS. 10-11, the door top rail system 1 can be coupled to a snap-in header 3 through the pivot 264. The door top snap-in header 3 comprises an extended header base 310 and an extended removable track 350, wherein the removable track can be snapped into the extended header base 310. The door top snap-in header 3 provides an easy to install support for the top of the glass door. As shown in FIG. 10, the extended header base 310 is first attached to a surface (not shown) positioned on top of the glass door, then the removable track 350 can be snapped into the extended header base 310, and finally, the door top rail system 2 can be coupled to the door top snap-in header through the pivot 264. The door top snap-in header 3 is preferably made from wood.

As shown in FIGS. 10, the extended header base 310 may comprise two side surfaces 312 and 316, a top surface 314, and a bottom surface 318. As further shown in FIGS. 10-11, the bottom surface may comprise a pair of surfaces (338*a*, 338*b*), and a recess 320 to receive the snap-in track 350. The recess 320 may comprise an end surface 324 that is positioned between a pair of walls 322 and 326. The end surface 324 may comprise a surface 336*c* that is positioned between the pair of side walls 322 and 326. The surface 336*c* can be a horizontal surface. The pair of side walls (322, 326) may comprise a pair of side wall recesses (330*a*, 330*b*), a pair of side wall projections (332*a*, 332*b*), a pair of channels (334*a*, 334*b*), and a pair of side wall surfaces (336*a*, 336*b*), wherein as shown in FIG. 11, the pair of channels are positioned between the pair of side wall projections and the pair of side wall surfaces. The pair of side wall surfaces (336*a*, 336*b*) can be two mutually opposite parallel walls that are positioned in a predetermined distance (w2) from each other (shown in FIGS. 10-11). The pair of side wall surfaces (336*a*, 336*b*) can be two vertical walls. The pair of channels (334*a*, 334*b*) can be two mutually opposite parallel channels that are positioned in a predetermined distance (w1) from each other as shown in FIGS. 10-11, wherein w2 is smaller than w1. The top surface 314 can be a curved surface which limits the contact of the top surface 314 with adjacent flat surfaces to the two edges of the curved surface.

Figure 12:
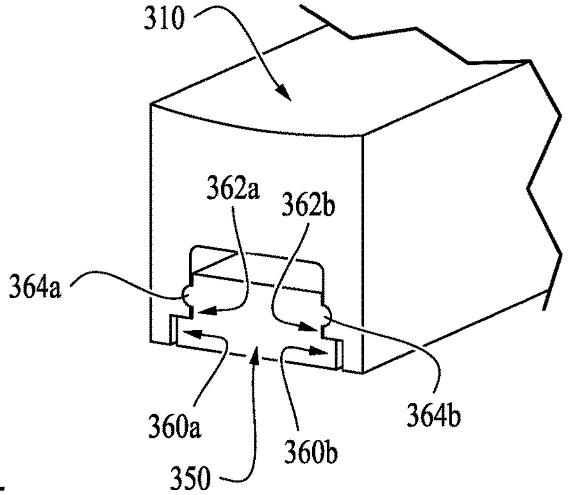
FIG. 12 illustrates a perspective view of the door top snap-in header in its snapped-in position.

As shown in FIGS. 11-12, the removable track 350 may comprise a pair of walls (352, 356), a top surface 354, and a bottom surface 358. The top surface 354 may comprise a surface 366*c*. The surface 366*c* can be a horizontal surface. As further shown in FIG. 12 in view of FIG. 11, the pair of walls (352, 356) may comprise a pair of projections (360*a* and 360*b*), a pair of recesses (362*a*, 362*b*), a pair of curved projections (364*a*, 364*b*), and a pair of guide walls (366*a*, 366*b*). The pair of guide walls (366*a*, 366*b*) can be two mutually opposite, parallel, vertical walls that are positioned in a predetermined distance from each other. As shown in FIGS. 10-12, the pair of walls (352, 356) of the removable track 350 conform to the shape of the pair of walls (322, 326) of the recess 320 of the header base 310. As shown in the FIG. 11-12, the removable track 350 can be pushed into the recess 320 through the pair of guide walls (366*a*, 366*b*) by a force fit/snap fit mechanism and can be held in place when the pair of curved projections (364*a*, 364*b*) are snapped into the pair of channels (334*a*, 334*b*). While the pair of side wall projections (332*a*, 332*b*) resist the insertion of the removable track 350 into the recess 320, after the removable track 350 is being snapped in place, the pair of side wall projections (332*a*, 332*b*) will resist the removal of the track 350 from the recess 320. In the snapped-in position, the surface 366*c* of the removable track 350 can be positioned in a predetermined distance (11 as shown in FIG. 10) of the surface 336*c* of the extended header base 310, thereby, providing a space for installation of other components such as other attachment mechanisms.

Sidelite Rail Systems

Figure 13:
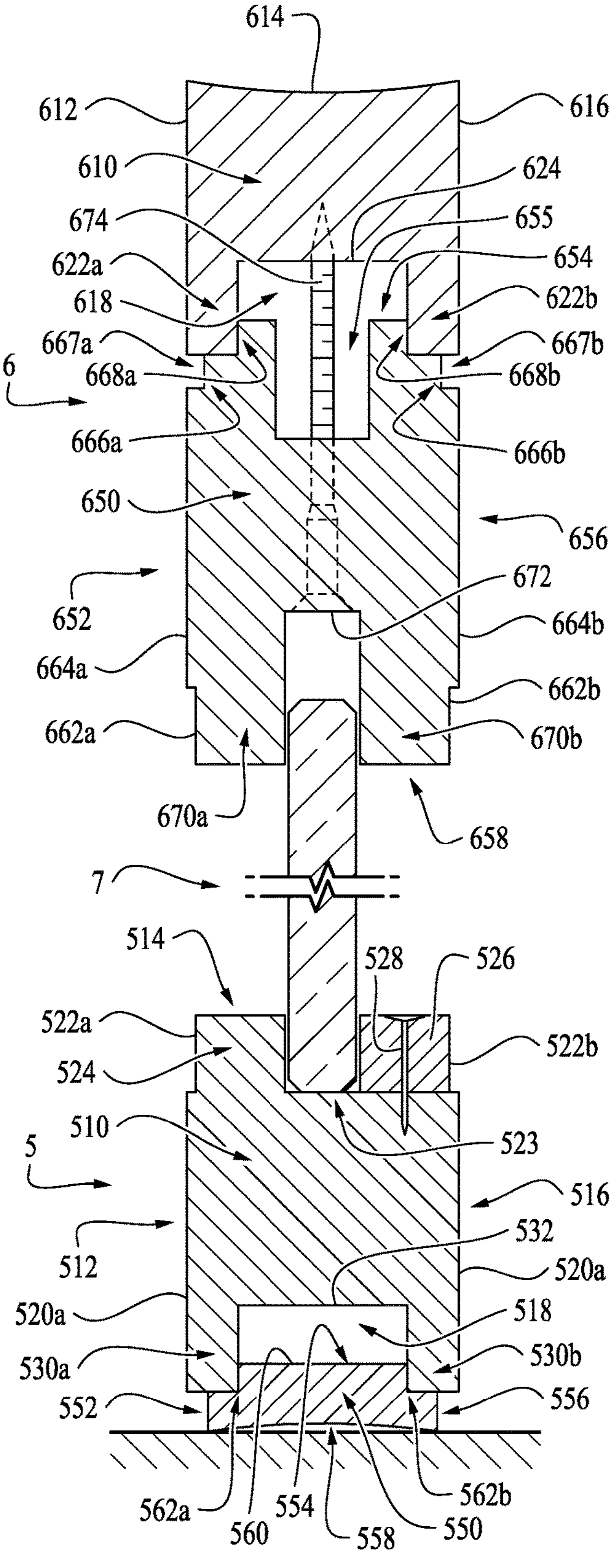
FIG. 13 illustrates a cross section of the sidelite while a glass pane of the sidelite is being held in place between a sidelite bottom rail system and a sidelite top rail system.
Figure 14:
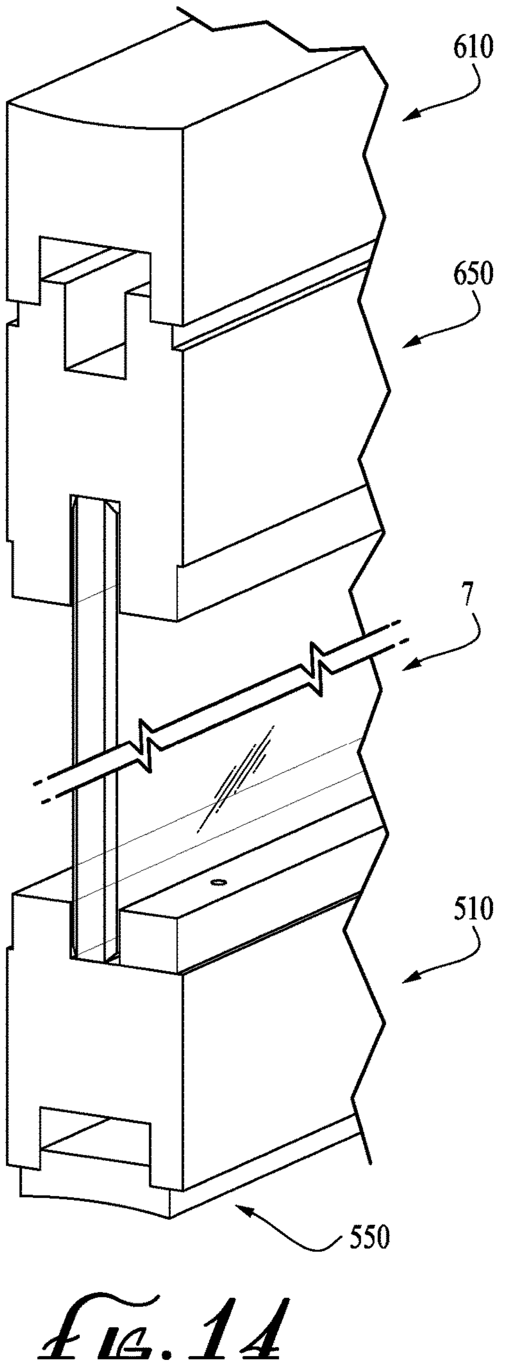
FIG. 14 illustrates a perspective view of the sidelite while a glass pane of the sidelite is being held in place between a sidelite bottom rail system and a sidelite top rail system.

A sidelite is a window that is positioned alongside a glass door (as shown in FIG. 1). As shown in FIG. 1, the sidelite may comprise a glass pane 7 that is held in place between a sidelite bottom rail system 5 and a sidelite top rail system 6. FIGS. 13-14 illustrate the sidelite bottom rail system 5 and the sidelite top rail system 6. FIG. 13 illustrates a cross section of a sidelite while a glass pane 7 of the sidelite is being held in place between the sidelite bottom rail system 5 and the sidelite top rail system 6. FIG. 14 illustrates a perspective view of the sidelite while the glass pane 7 of the sidelite is being held in place between the sidelite bottom rail system 5 and the sidelite top rail system 6. In an implementation of this invention, the sidelite bottom rail system 5 can be adapted to be longitudinally aligned with the glass door bottom rail system 1 (as illustrated in FIG. 1) when the glass door is closed, and the sidelite top rail system 6 can be adapted to be longitudinally aligned with the glass door top rail system 2 when the glass door is closed. The sidelite bottom rail system 5 and the sidelite top rail system 6 are preferably made from wood. In a preferred embodiment of this invention, the external appearance of the sidelite bottom rail system 5 and the sidelite top rail system 6 are adapted to conform to the external appearance of the glass door top and bottom rail systems (1, 2) and the snap-in header 3 (as generally illustrated in FIG. 1).

Sidelite Bottom Rail System

According to FIGS. 13-14, the sidelite bottom rail system 5 may comprise a floor base track 550 and a sidelite bottom glass holder track 510. The floor base track 550 is first affixed to the floor, and then the bottom glass holder track 510 is placed on the floor base track 550. The floor base track 550 may comprise a pair of walls (552, 556), a top surface 554, and a bottom surface 558. The top surface 554 may comprise a surface 560 that is positioned between a pair of recesses (562*a*, 562*b*). The bottom surface 558 can be a curved surface which limits the contact of the floor base track 550 with adjacent flat surfaces/floor to the two edges of the curved bottom surface.

According to FIGS. 13-14, the bottom glass holder track 510 may comprise a pair of walls (512, 516), a top surface 514, and a bottom surface 518. The bottom surface 518 may comprise a recess 532 that is formed between two projections 530*a* and 530*b*. The pair of walls (512, 516) may have a pair of recesses (522*a*, 522*b*). The top surface 514 may comprise a channel 523 that is formed between two projections (524, 526). One of the projections (524, 526) can be a removeable projection that can be attached to the bottom glass holder 510 through a pin or other attachment mechanisms such as screws, friction fit, snap fit, or an adhesive material. For example, the projection 526 can be a removeable projection that can be attached to the bottom glass holder 510 through a pin 528 or other attachment mechanisms such as screws, friction fit, snap fit, or an adhesive material. In this example, the removable projection 526 can be attached to the bottom glass holder 510 after the glass pane 7 is positioned in the channel 523 to hold the glass pane 7 in place. The two projections 530*a* and 530*b* of the bottom glass holder 510 can be placed on the pair of recesses (562*a*, 562*b*) of the floor bottom track 550, thereby coupling the bottom glass holder 510 to the floor bottom track 550. In an implementation of this invention, the pair of walls (512, 516) of the bottom glass holder track 510 can be formed similar to the external surfaces of the side covers of the bottom rail system 5. The sidelite bottom rail system can be adapted to be longitudinally aligned with the bottom rail system 1 as illustrated in FIG. 1 when the glass door is closed.

Sidelite Top Rail System

According to FIGS. 13-14, the sidelite top rail system 6 may comprise a top base track 610 and a top glass holder track 650. The top base track 610 may comprise a pair of walls (612, 616), a top surface 614, and a bottom surface 618. The top surface 614 can be a curved surface which limits the contact of the top base track 614 with adjacent flat surfaces/frames/ceiling to the two edges of the curved top surface 614. The bottom surface 618 may comprise a recess 624 that is formed between two projections 622*a* and 622*b*.

The top glass holder track 650 may comprise a pair of walls (652, 656), a top surface 654, and a bottom surface 658. The top surface 654 may comprise a recess 655 that is formed between two pairs of mutually opposite projections (668*a* & 668*b*, 666*a* & 666*b*). The wall 652 may comprise a surface 664*a* that is positioned between two recesses 662*a* and 667*a*. The wall 656 may comprise a surface 664*b* that is positioned between two recesses 662*b* and 667*b*. The bottom surface 658 may comprise a channel 672 that is formed between two projections 670*a* and 670*b*. The channel 672 is adapted to receive a top of the glass pane 7. According to an implementation of the invention, when the glass pane 7 is held in place between the two projections 670*a* and 670*b*, the top of the glass pane 7 does not completely fill the channel 672, thereby making an accessory channel space to hold miscellaneous hardware such as a fastening hardware.

The top base track 610 is adapted to be attached to a surface on top of the top base track such as a door frame, ceiling, or other surfaces. The top glass holder track 650 is adapted to be coupled to the bottom surface 618 of the top base track 610 through a screw 674 as shown in FIG. 13, or other attachment mechanisms such as a force fit, friction fit, snap fit, or an adhesive mechanism. The projections 668*a* and 668*b* of the top surface 655 of the top glass holder track 650 can be fixed in place between the two pair of mutually opposite projections (668*a* & 668*b*, 666*a* & 666*b*) of the top base track 610, thereby, providing a friction fit mechanism for holding the parts together. When the top base track 610 and the top glass holder track 650 are coupled together, the recess 624 and the recess 655 provide an empty space for other attachment mechanisms (not shown) that can be used for holding the parts together or for attaching the parts to other surfaces such as a ceiling or a frame. In an implementation of this invention, the top glass holder track 650 can be adapted to be longitudinally aligned with the top rail system 2 when the door is closed, and the top base track 610 can be adapted to be longitudinally aligned with the snap-in header 3 (as generally shown in FIG. 1).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claim.

What is claimed is:

1. A cover configured for use with a rail system, the rail system having a first extended sidewall and a second extended side wall, the first extended sidewall having an inwardly inclined sidewall and an extended flat surface, the rail system operatively couplable to a glass pane, the cover comprising:

an elongated body made from wood;

the elongated body having an internal surface, an external surface, a first end surface, a second end surface, and a height;

the internal surface conforms to the first extended sidewall of the rail system;

the internal surface comprising a recess;

the recess is adapted to adjoin the extended flat surface of the first extended sidewall through an attachment mechanism; and the recess has a height, and the height of the recess is bigger than ⅓ of the height of the elongated body.

2. The cover of claim 1 wherein the extended flat surface is adapted to be parallel to the glass pane.

3. The cover of claim 1 wherein the internal surface of the elongated body further comprises a first inclined surface;

Wherein the first inclined surface is inclined toward the first inwardly inclined sidewall of the rail system.

4. The cover of claim 3 wherein the first inclined surface of the elongated body is not in direct contact with the inwardly inclined sidewall of the rail system.

5. A wood clad rail system for a glass door and a sidelite, the glass door having a top clamping rail and a bottom clamping rail, the top clamping rail having a pair of mutually opposite inclined sidewalls and a pair of mutually opposite vertical sidewalls, the top clamping rail and the bottom clamping rail holding a first glass pane, the side light having a second glass pane, an improvement to the wood clad rail system comprising:

a pair of extended side covers for covering the top clamping rail;

the extended side covers are made from wood;

the extended side covers having a pair of extended inclined surfaces and a pair of extended vertical surfaces;

the pair of extended vertical surfaces are adapted to adjoin the pair of mutually opposite vertical sidewalls by an attachment mechanism;

the pair of extended inclined surfaces are adapted to conform to the pair of mutually opposite inclined sidewalls;

a snap-in header for providing a support for the glass door;

the snap-in header is made from wood;

the snap-in header comprising an extended header base and an extended removable track;

the extended header base comprising a bottom surface, the bottom surface having a recess;

the extended removable track is adapted to snap into the recess of the extended header base;

wherein the top clamping rail is rotatably coupled to the snap-in header, thereby allowing the glass door to rotate relative to the snap-in header.

6. The improvement to the system of claim 5, wherein the recess having a pair of channels;

the extended removable track comprising a pair of extended projections;

the extended removable track being configured to be snapped into the recess of the extended header base, and the pair of extended projections being configured to be received within the pair of channels.

7. The improvement to the system of claim 6, wherein the pair of channels are a pair of mutually opposite parallel channels and the pair of extended projections are a pair of mutually opposite extended parallel projections.

8. The improvement to the system of claim 5, wherein the attachment mechanism is an adhesive attachment mechanism.

9. The improvement to the system of claim 5, further comprising:

a top rail system for holding a top of the second glass pane of the sidelite;

the top rail system is made from wood;

the top rail system comprising a top base track and a top glass holder track;

the top glass holder track having a lower channel and a top surface;

the top base track having a bottom surface;

the lower channel is adapted to receive the top of the second glass pane;

the top surface of the top glass holder track is adapted to be coupled to the bottom surface of the top base track;

wherein the top rail system is adapted to be longitudinally aligned with the top clamping rail.

10. The improvement to the system of claim 9, further comprising:

a bottom rail system for a bottom of the second glass pane of the sidelite;

the bottom rail system is made from wood;

the bottom rail system comprising a bottom base track and a bottom glass holder track;

the bottom glass holder track having a top channel, the top channel is adapted to receive the bottom of the second glass pane;

the bottom glass holder track is adapted to be place on the bottom base track;

wherein the bottom rail system is adapted to be longitudinally aligned with the bottom clamping rail.

11. A wood clad rail system for a glass door and a sidelite, the glass door having a top clamping rail and a bottom clamping rail, the top clamping rail having a pair of mutually opposite inclined sidewalls and a pair of mutually opposite vertical sidewalls, the top clamping rail and the bottom clamping rail holding a first glass pane, the sidelite having a second glass pane, an improvement to the wood clad rail system comprising:

a pair of extended side covers for covering the top clamping rail;

the extended side covers are made from wood;

the extended side covers having a pair of extended inclined surfaces and a pair of extended vertical surfaces;

the pair of extended vertical surfaces are adapted to adjoin the pair of mutually opposite vertical sidewalls by an attachment mechanism;

the pair of extended inclined surfaces are adapted to conform to the pair of mutually opposite inclined sidewalls;

a top rail system for holding a top of the second glass pane of the sidelite;

the top rail system is made from wood;

the top rail system comprises a top base track and a top glass holder track;

the top glass holder track having a lower channel and a top surface;

the top base track having a bottom surface;

the lower channel is adapted to receive a top of the second glass pane;

the top surface of the glass holder track is adapted to be coupled to the bottom surface of the top base track;

wherein the top glass holder track is adapted to be longitudinally aligned with the top clamping rail and the pair of extended side covers.

12. The improvement to the system of claim 11, further comprising:

a bottom rail system for holding a bottom of the second glass pane of the sidelite;

the bottom rail system is made from wood;

the bottom rail system comprising a bottom base track and a bottom glass holder track;

the bottom glass holder track having a top channel, the top channel is adapted to receive the bottom of the second glass pane;

the bottom glass holder track is adapted to be place on the bottom base track;

wherein the bottom rail system is adapted to be longitudinally aligned with the bottom clamping rail.

13. The improvement to the system of claim 11, wherein the recess having a pair of channels;

the extended removable track comprising a pair of extended projections;

the extended removable track being configured to be snapped into the recess of the extended header base, and the pair of extended projections being configured to be received within the pair of channels.

14. The improvement to the system of claim 11, wherein the pair of channels are a pair of mutually opposite parallel channels and the pair of extended projections are a pair of mutually opposite extended parallel projections.

15. The improvement to the system of claim 11, wherein the attachment mechanism is an adhesive attachment mechanism.

* * * * *